US011282109B2

United States Patent
Golden et al.

(10) Patent No.: US 11,282,109 B2
(45) Date of Patent: Mar. 22, 2022

(54) SYSTEMS AND METHODS FOR PRESENTING AND DELIVERING CONTENT

(71) Applicant: MOASIS GLOBAL CORPORATION, San Francisco, CA (US)

(72) Inventors: Steve Golden, San Francisco, CA (US); Ryan Golden, Mountain View, CA (US); Jason Mascari, Rockford, MI (US)

(73) Assignee: MOASIS GLOBAL CORPORATION, San Francisco, CA (US)

(*) Notice: Subject to any disclaimer, the term of this patent is extended or adjusted under 35 U.S.C. 154(b) by 420 days.

(21) Appl. No.: 15/019,423

(22) Filed: Feb. 9, 2016

(65) Prior Publication Data

US 2016/0225026 A1 Aug. 4, 2016

Related U.S. Application Data

(63) Continuation of application No. 13/773,127, filed on Feb. 21, 2013, now abandoned.

(51) Int. Cl.
*G06Q 30/02* (2012.01)
*H04W 4/029* (2018.01)

(52) U.S. Cl.
CPC ..... *G06Q 30/0261* (2013.01); *G06Q 30/0256* (2013.01); *G06Q 30/0267* (2013.01); *G06Q 30/0275* (2013.01); *H04W 4/029* (2018.02)

(58) Field of Classification Search
CPC .................................................. G06Q 30/02
See application file for complete search history.

(56) References Cited

U.S. PATENT DOCUMENTS 6,694,132 B1 * 2/2004 Lausi ................ H04M 3/42348
379/37
8,229,766 B2 * 7/2012 Carttar .................... G06F 16/29
705/4

(Continued)

FOREIGN PATENT DOCUMENTS

CN 1290104 4/2001
EP 1271458 1/2003

(Continued)

OTHER PUBLICATIONS

Clear channel outdoor holdings inc at morgan Stanley technology, media and telecom conference (virtual)—final. (Mar. 1, 2021). Fair Disclosure Wire Retrieved from https://dialog.proquest.com/professional/docview/2501300622?accountid=131444 (Year: 2021).*

*Primary Examiner* — Vincent M Cao
(74) *Attorney, Agent, or Firm* — Lee & Hayes, P.C.

(57) ABSTRACT

Systems and methods are provided for presenting information about discrete geographical areas and the use of such information by content providers to facilitate delivery of targeted or geographically relevant content to information playback devices located in one or more particular discrete geographical areas. Data (e.g., contextual, behavioral, predictive, trending, geo-consumer patterns) can be collected and associated with relevant virtual cells within a grid. A portal can be provided to enable content provider to search the cells based on customized campaigns to identify trends, interest, patterns and opportunities. Such information can facilitate informed geo-targeting decisions and consumer understandings for business of all sizes and sectors in order to deliver more relevant content to information playback devices within selected cells according to customized settings configured by the content provider.

20 Claims, 8 Drawing Sheets

(56) References Cited

U.S. PATENT DOCUMENTS

| | | | |
|---|---|---|---|
| 2003/0006911 A1* | 1/2003 | Smith | G06Q 30/02 340/988 |
| 2004/0054589 A1* | 3/2004 | Nicholas | G06Q 30/02 705/14.52 |
| 2004/0174397 A1* | 9/2004 | Cereghini | G06Q 30/02 715/855 |
| 2005/0055275 A1* | 3/2005 | Newman | G06Q 30/02 705/14.41 |
| 2006/0242024 A1* | 10/2006 | Mattingly | G06Q 30/02 705/14.41 |
| 2007/0100688 A1* | 5/2007 | Book | G06Q 30/02 705/14.52 |
| 2007/0270132 A1* | 11/2007 | Poosala | G06Q 30/00 455/414.2 |
| 2009/0239552 A1* | 9/2009 | Churchill | G06F 16/9537 455/456.3 |
| 2010/0041419 A1* | 2/2010 | Svendsen | G06Q 30/02 455/456.3 |
| 2010/0318407 A1* | 12/2010 | Left | G06Q 10/107 705/14.1 |
| 2011/0040603 A1* | 2/2011 | Wolfe | G06Q 30/02 705/7.31 |
| 2011/0184809 A1* | 7/2011 | Beavers | G06Q 30/02 705/14.64 |
| 2012/0036034 A1* | 2/2012 | Golden | H04W 4/02 705/26.3 |
| 2013/0055309 A1* | 2/2013 | Dittus | G06Q 30/02 725/35 |
| 2013/0073336 A1* | 3/2013 | Heath | G06Q 30/02 705/7.29 |

FOREIGN PATENT DOCUMENTS

| | | |
|---|---|---|
| JP | 2003337898 | 11/2003 |
| WO | 2008124537 | 10/2008 |

* cited by examiner

SYSTEMS AND METHODS FOR PRESENTING AND DELIVERING CONTENT

CROSS-REFERENCE TO RELATED APPLICATION

This application is a continuation application of U.S. nonprovisional patent application Ser. No. 13/773,127 filed on Feb. 21, 2013.

FIELD OF THE INVENTION

Embodiments relate, in general, to information communication methods and systems. More particularly, embodiments relate to methods and systems for presenting information associated with discrete geographical areas and/or delivering content based on such information.

BACKGROUND

The last two decades have seen a revolution in how information such as news, advertising, or other content is transmitted to viewers over long distances. With the widespread use of the Internet and information playback devices such as computers, electronic billboards, global positioning devices, and cellular telephones, the volume of information that is provided to individuals is expanding quickly. With so much information available, content providers are grappling with the problem of how to efficiently organize and transmit information to the demographic most likely to use it.

SUMMARY

Described herein is a method of delivering targeted or geographically relevant content including the steps of: dividing a geographical area into a virtual grid including a plurality of cells; assigning geographically relevant information to the plurality of cells; responsive to receiving a search campaign including a set of location rules, comparing the set of location rules to the geographically relevant information assigned to the plurality of cells; and outputting the cells that match one or more of the set of location rules of the search campaign, whereby informed geo-targeting decisions and consumer understandings is facilitated so more relevant content can be selectively delivered to information playback devices within one or more of the cells.

The location rules can include a geography rule that enables searching the grid for cells based on one or more geographic parameters; a businesses rule that enables searching the grid for cells based on one or more business names and/or one or more business types; an audiences rule that enables searching the grid for cells based on an audience or demographic parameters; a census rule that enables searching the grid for cells based on data available from a provider of census data; and/or an impressions rule that enables searching the grid for cells based on the average or actual number of impressions in a cell within a period of time.

The above method might further include the steps of: offering access to geographically relevant information from a third party provider upon satisfying a condition (e.g., payment of a fee); responsive to satisfying the condition, allowing access to the geographically relevant information from the third party provider; and assigning the geographically relevant information from the third party provider to respective cells of the grid. In some embodiments, the above methods can further include a step of presenting location rules associated with the geographically relevant information from the third party provider, whereby further customized searching of the grid is enabled; and/or accepting an offer for content placement in one or more cells within the grid from a content provider, and transmitting at least a portion of content received from the content provider to an information playback device located in the cell, whereby at least a portion of the obtained content is displayed on the information playback device. The latter might further include a step of receiving one or more localizement rules assigned to the winning bid, and wherein the transmitting is performed in accordance with the one or more localizement rules (e.g., wherein the localizement rules include one of a weather condition, a social media condition or a traffic condition relating to the cell).

In the methods described herein, the outputting can also include presenting the matching cells on a map of an area including the matching cells, the map including the virtual grid for the area shown.

Further described herein is a system for delivering content in a location-specific manner to information playback devices. This system can include: a computing system having a processor configured to: divide a geographical area into a virtual grid including a plurality of cells; assign geographically relevant information to at least a portion of the plurality of cells; compare the set of location rules to the geographically relevant information assigned to the plurality of cells in response to receiving a search campaign including a set of location rules submitted; and output the cells that match one or more of the set of location rules, whereby informed geo-targeting decisions and consumer understandings is facilitated so more relevant content can be selectively delivered to information playback devices within one or more of the cells.

In the foregoing system, the location rules include at least one (e.g., 1, 2, 3, 4, or 5) of: a geography rule that enables searching the grid for cells based on one or more geographic parameters; a businesses rule that enables searching the grid for cells based on one or more business names and/or one or more business types; an audiences rule that enables searching the grid for cells based on an audience or demographic parameters; a census rule that enables searching the grid for cells based on data available from the U.S. Census Bureau; and an impressions rule that enables searching the grid for cells based on the average or actual number of impressions in a cell within a period of time.

The system might also be configured to: accept an offer for content placement in one or more cells within the grid from a content provider; and transmit content from the content provider submitting the accepted offer to an information playback device located in the cell, whereby at least a portion of the obtained content is displayed on the information playback device. The system might also be configured for receiving one or more localizement rules assigned to the winning bid, wherein the transmitting is performed in accordance with the one or more localizement rules. The localizement rules might include one or more of a weather condition, a social media condition or a traffic condition relating to the cell.

In some embodiments of the system the output can include presenting the matching cells on a map of an area including the matching cells, wherein the map includes the virtual grid for the area shown.

The system might also include a location tracking system for determining the geographical location of one or more information playback devices from signals transmitted from the one or more information playback devices; and a transceiver for receiving positional information from the location tracking system, the transceiver being communicatively coupled to the computing system.

DETAILED DESCRIPTION

Figure 1:
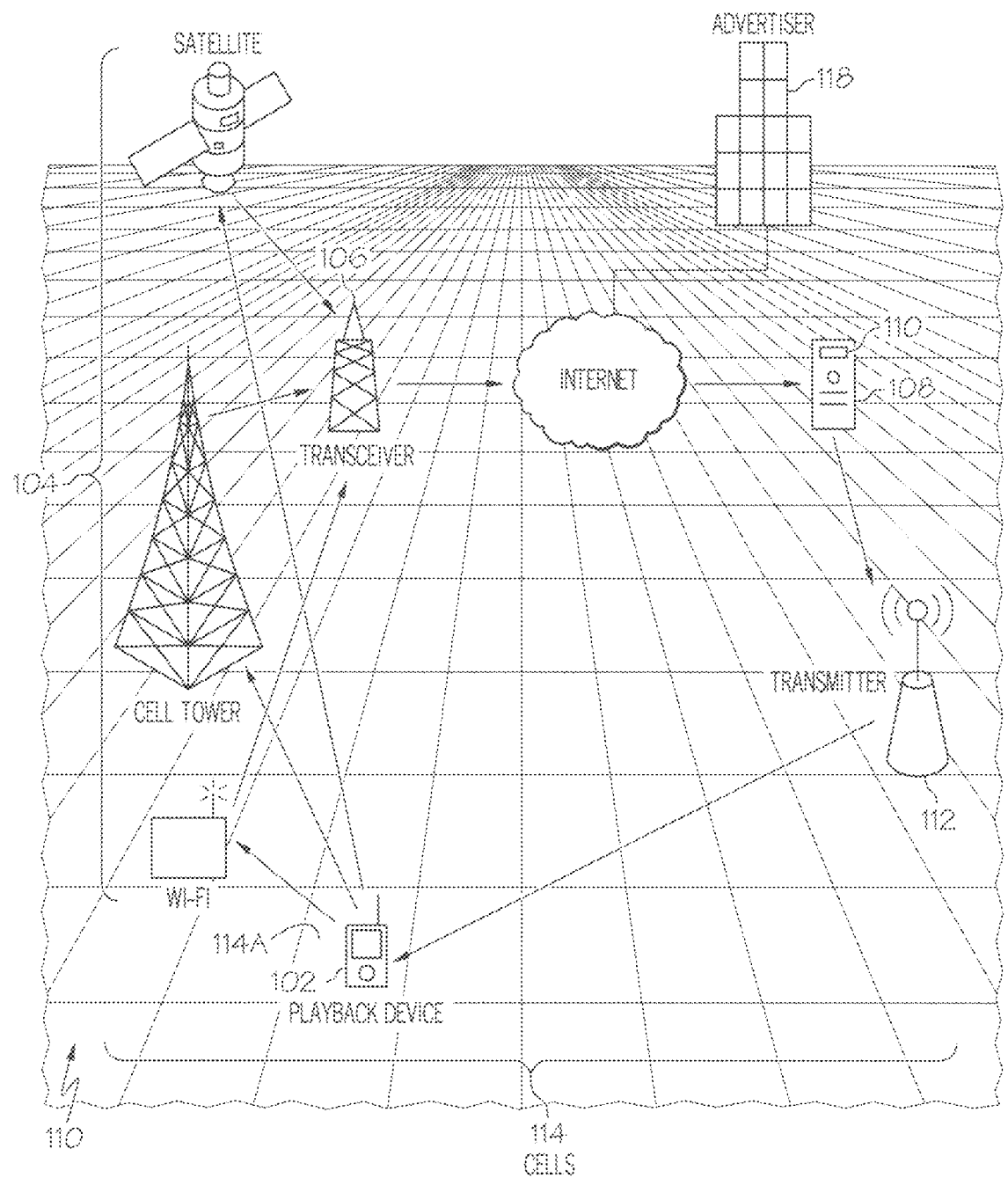
FIG. 1 is an example of a location-based system for delivering targeted content or geo-specific output to information playback devices located in virtual cells of a virtual grid.

Arrangements described herein relate to systems and methods presenting information about discrete geographical areas (e.g. one or more virtual cells defined by a virtual grid) and the use of such information by content providers to facilitate delivery of targeted or geographically relevant content to information playback devices located in one or more particular discrete geographical areas. Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of embodiments and aspects herein. Arrangements are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The systems and methods can facilitate content providers in communicating content to information playback devices in a location. "Content" includes advertising, data or information in any suitable form, including text, graphics, pinpoints (which identify a certain area on the map that will interact with the grid), photographs, visuals, video and/or audio, hyperlinks and/or interactivity data. Embodiments can be used to communicate any type of content including, without limitation, data, coupons, incentives, offers, promotions, sales, savings, free standing inserts, blogs, micro-blogs, tweets, pinpoints, bar codes, public announcements, emergency alerts, notes, action triggers, listings, and the like. "Content providers" can include advertisers, marketers, retailers, companies, businesses, organizations, government entities, individuals or other providers of any size.

Embodiments here may be embodied as a system, method or computer program product. An embodiment can include a system having a processor. The processor can be configured to initiate executable operations including any of those shown and/or described herein. Another embodiment is a method of performing one or more operations including any of those shown and described herein. One or more of the operations can be performed by a processor. Another embodiment can include a computer program product for performing one or more operations including any of those shown and/or described herein. The computer program product can include a computer readable storage medium having stored thereon program code that, when executed, configures a processor to perform one or more operations including any of those shown and described herein.

Accordingly, embodiments herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects herein may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for embodiments herein may be written in any combination of one or more programming languages, including an object oriented programming language such as Java™ Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments herein are described below with reference to illustrations and/or screenshots of methods, apparatus (systems), and computer program products according to embodiments herein. It will be understood that embodiments shown herein can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the illustrations and/or screenshots.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In an exemplary implementation of a system in accordance with embodiments herein, the system can include at least one processor coupled to one or more memory elements through a system bus or other suitable circuitry or means. As such, system can store program code within the one or more memory elements. The processor can execute the program code accessed from memory elements via system bus or other suitable circuitry or means. In one aspect, for example, system can be implemented as a computer that is suitable for storing and/or executing program code. It should be appreciated, however, that system can be implemented in the form of any system including a processor and memory that is capable of performing the functions and/or operations described within this specification.

Embodiments herein can be implemented in a cloud computing environment. Cloud computing can allow access to a shared pool of computing resources (e.g. networks, servers, processors, memory, storage, applications, etc.). It will be understood, however, that embodiments herein are not limited to implementation in a cloud computing environment. Rather, embodiments can be implemented in connection with any other suitable type of computing environment now known or later developed. Embodiments can be implemented on and/or accessed by any suitable device, including, for example, an Internet enabled device and may operate on any compatible web browser.

The processor may be implemented with one or more general-purpose and/or special-purpose processors. Examples of suitable processors include microprocessors, microcontrollers, DSP processors, and other circuitry that can execute software. The processor can include one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described and/or shown herein.

Memory elements can include one or more physical memory devices such as, for example, local memory and one or more bulk storage devices. Local memory refers to RAM or other non-persistent memory device(s) generally used during actual execution of the program code. Bulk storage device(s) can be implemented as a hard disk drive (HDD), solid state drive (SSD), or other persistent data storage device. System also can include one or more cache memories (not shown) that provide temporary storage of at least some program code in order to reduce the number of times program code must be retrieved from bulk storage device during execution.

Input/output (I/O) devices such as a keyboard, a display, and a pointing device optionally can be coupled to system. The I/O devices can be coupled to system either directly or through intervening I/O controllers. One or more network adapters also can be coupled to system to enable system to become coupled to other systems, computer systems, remote printers, and/or remote storage devices through intervening private or public networks. Modems, cable modems, and Ethernet cards are examples of different types of network adapters that can be used with system.

Systems for Presenting and Selectively Communicating Information

Referring now to FIG. 1, in an exemplary embodiment, the systems and methods for delivery of targeted or geographically relevant content to information playback devices located in discrete geographical areas can be implemented by system 100. The system 100 can facilitate the communication of content to one or more information playback devices 102 in a location-selective manner. The system 100 can include a location tracking system 104 for determining the geographical location of the information playback device 102 (e.g., in terms of latitude and longitude or other suitable geographic coordinate system). The information playback devices 102 can be configured to transmit signals to the location tracking system 104 and receive signals from an external source.

The system 100 can include a transceiver 106 for receiving positional information from the location tracking system 104. The system 100 can further include a server 108 communicatively coupled to the transceiver 106. The term "communicatively coupled" is defined as a state in which two or more components are connected such that communication signals are able to be exchanged between the components on a unidirectional or bidirectional manner, either wirelessly, through a wired connection or a combination of both. The server 108 or other portion of the system 100 can include mapping software and software for creating a virtual grid. A set of information can be stored in a database 110 on the server 108. The system 100 can include a transmitter 112 communicatively coupled to the server 108. The transmitter 112 can be configured to transmit the set of information to the information playback device 102 in a location-selective manner. Each of the foregoing components can be included in multiplicity, e.g., the invention may include one or more computers, information playback devices, location tracking systems, transceivers, different sets of information, and transmitters.

The mapping software and virtual grid creating software may be installed on one or more of the servers 108, which can be communicatively coupled to each other. The mapping software and virtual grid creating software may include high quality earth imagery and geospatial information imagery used to analyze location within cells (granular units) within the grid. One or more information playback devices 102 can be communicatively coupled to the location tracking system 104. The location tracking system 104 can be any system capable of determining the geographical location of an information playback device 102. For example, the location tracking system can be a GPS (e.g., the NAVSTR GPS) or a triangulation system that determines a devices location by the strength of its signals as measured by multiple signal monitors (e.g., cell towers or WI-FI transceivers). Further, the location tracking system 104 can a global positioning system, a local positioning system or a geolocation system. The positioning system 18 may be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. In some cases, the positional information obtained by the location tracking system 104 might round coordinates to less specific locations or otherwise use fuzzy logic processing to reduce the specificity of the specific positional data.

Alternatively or in addition, the location tracking system 104 can be based on access point geolocation services, such as using the W3C Geolocation Application Programming Interface (API). With such a system, the location of the information playback device 102 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the information playback device 102 is determined will depend on the manner of operation of the particular location tracking system 104 used.

The information playback device 102 can be any suitable device capable of conveying information to a user, transmitting positional information to the location tracking system 104 and receiving information sent from the transmitter 112. In some instances, the information playback device 102 can be configured to communicate via a wireless or wired medium. The information playback device 102 can be portable or stationary (e.g., fixed in place such that it is difficult to move). The information playback device 102 can be any suitable device including, for example, a cellular telephone, a smart phone, a personal digital assistant ("PDA"), a digital reader, a handheld device having wired or wireless connection capability, a computer (e.g., a laptop, tablet, desktop, netbook, notebook, etc.), a portable communication device, a portable computing device, an entertainment device (e.g., a music or video device, or a satellite radio), a global positioning system device, a digital audio player (e.g., MP3 player), fixed digital billboards, wrist watches, an e-book reader, a camera or a game console, transit digital billboards and or devices, Flexible E-Paper Display (EPD), and GPS navigation devices. The electrical device 10 can include any suitable operating system. The information playback device 102 can further include one or more transceivers. The transceiver can be operatively connected to a processor and/or memory of the information playback device 102. The memory and processor of the information playback device 102 can be operatively connected. The term "operatively connected," as used throughout this description, can include direct or indirect connections, including connections without direct physical contact.

Again, the system 100 can include one or more transceivers 106. Any suitable transceiver can be used to access a network, access point, node or other device for the transmission and receipt of data. The transceiver 106 can receive positional information from the location tracking system 104 and can take the form of any device capable of receiving a signal from the information playback device 102 and conveying such signal to the server 108. Thus, the transceiver 106 can be a device that includes an antenna, modulates and demodulates signals, and converts such signals from one form to another. The transceiver 106 may operate over wired and/or wireless communication networks. As an example, the transceiver 106 can be configured to communicate data via IEEE 802 wireless communications (e.g., 802.11, 802.16, WPA, WPA2, TDMA, CDMA, WCDMA, GSM, GPRS, UTMS, 3G, 4G, EUTAN, UMB, OFDM, or LTE systems). Additional examples of suitable transceivers include a cellular transceiver, broadband Internet transceiver, local area network (LAN) transceiver, wide area network (WAN) transceiver, wireless local area network (WLAN) transceiver, personal area network (PAN) transceiver, body area network (BAN) transceiver, WiFi transceiver, WiMax transceiver, Bluetooth transceiver, 3G transceiver, 4G transceiver, ZigBee transceiver, WirelessHART transceiver, MiWi transceiver, IEEE 802.11 transceiver, IEEE 802.15.4 transceiver, or a Near Field Communication (NFC) transceiver, just to name a few possibilities. The transceiver can include any wireless technology developed in the future. The transceiver can be any combination of the above noted transceivers. The transceiver 106 can also be configured to communicate over a wireless communication link using a communication protocol such as TCP/IP. In some embodiments, the transceiver 106 can be integrated into the information playback device 102 itself. In such case, the transceiver 106 can communicate directly with the server 108. In addition, hard-wired devices could be used, e.g., a network of roadside billboards each assigned an individual code that can be transmitted.

The server 108 can be a computer or set of computers running one or more computer programs such as a mapping program and/or a program for creating a virtual grid that divides a given geographical area into two or more discrete cells. The server 108 can be in communication with the transceiver 106 and transmitter 112. The server 108 might also include a memory store that stores data corresponding to information (e.g., advertising) which can be transmitted to the information playback device 102, which can be remotely located (e.g., 1, 2, 5, 10, 50, 100, 500 or more km) from the server 108. The information stored in the memory store can include audio and/or visual data. The mapping software can be any program capable of running on the server 108 and processing positional data of the information playback device 102.

The virtual grid software can be any program that can divide a given geographical area into a plurality of discrete (or in some cases overlapping) virtual cells 114. For example, the entire planet Earth, a country, a continent, a state, a city, a township or a region may be overlaid with a virtual grid 116 generated by the software. The virtual cells 114 can have any suitable shape. For example, each of the plurality of cells 114 can be a regular or irregular polygon (e.g., a quadrangle, a square, a rectangle, a rhombus, a triangle, a pentagon, a hexagon, or an octagon) defining an area of greater than or equal to 0.1, 0.5, 1, 2, 3, 4, 5, 6, 7, 8, 9, 10, 15, 25, 50, 75, 100, 200, 300, 400, 500, 1000 or more square km. In other embodiments of the system, each cell of the virtual grid 116 can have an area of about 0.25 km by 0.25 km, 0.5 km by 0.5 km, 0.75 km by 0.75 km, 0.5 km by 1 km, 1 km by 1 km, 1.5 km by 1.5 km, 1 km by 2 km, 2 km by 2 km, 1 km by 3 km, 5 km by 5 km, 10 km by 10 km, 25 km by 25 km, 50 km by 50 km, or 100 km by 100 km. In another embodiment, each of the plurality of cells 114 can be defined by longitude and latitude degrees such as greater than or equal to 0.0001, 0.001, 0.01, 0.1, 1, or 2 degrees longitude by 0.0001, 0.001, 0.01, 0.1, 1, or 2 degrees latitude. The cells 114 may also be non-polygonal, of different sizes and/or shapes, and/or defined by population size (e.g., 1000-2000; 2000-3000; 3000-5000; 5000-10,000; 10,000-25,000; 25,000-50,000; 50,000-100,000; or greater than 100,000 people in each cell). Further, the cells 114 can be adjustable in size.

The transmitter 112 can be communicatively coupled to the server 108 and can be configured to transmit a signal embodying the content to be sent to the information playback device 102. The content can be transmitted to information playback devices 102 that are physically located within the cell or cells 114 of the virtual grid 116 being targeted by an advertiser or other content provider 118. For example, the content provider 118 could choose to deploy targeted or geographically relevant content to information playback devices located in a particular neighborhood or city. In another example, the advertiser could target content or geographically relevant content to cells located in the path of a cruise ship so that the content can be received by information playback devices 102 aboard the cruise ship. In still another example, the information playback device 102 could be a satellite radio, GPS navigation system, or electronic billboard installed in an automobile.

In one embodiment, systems and methods herein can be used to selectively target content to an information playback device located in a particular cell, optionally in an application-specific manner. Upon turning on the information playback device 102 or opening a particular application in the information playback device 102, a signal can be transmitted from the information playback device 102 to the location tracking system 104. If the device 102 is already on, the information playback device 102 can transmit a signal to the location tracking system 104 on a continuous, periodic, irregular or random basis. The location tracking system 104 can convert the signal from the information playback device 102 to data corresponding to the physical location of the information playback device 102. The data corresponding to the physical location of the information playback device 102 can then transmitted to the server 108 (e.g., via a transceiver such as the information playback device 102 itself).

The server 108 can process this data and assign the information playback device 102 to a cell 114*a* in the virtual grid 116. The server 108 can also cause a signal embodying the content to be transmitted to the information playback device 102 which then can convert the signal to an output for presentation on the information playback device 102 to generate the content. For instance, the signal can be converted to audio and/or visual file that is played on the information playback device 102 to generate content. The content may be displayed in a "pop-up" window on the information playback device 102. The content might also be configured as a file that can be saved in a memory store on the information playback device 102 (e.g., a coupon or incentive that can be saved for use).

In an example, a mobile phone user may enter into a cell 114*a* of the virtual grid 116 where an advertiser or other content provider has submitted a winning bid (e.g., the highest monetary bid or a bid with the highest priority score calculated from a factor other than just a monetary amount). The system provider may offer placement of the information through an existing website such as, for example, Facebook™. When the user accesses the Facebook™ website on the user's mobile phone, the advertiser's information can be displayed, for example, in an information space located at the top of the web page or in another location on the web page. Additional examples are described in U.S. Patent Application Publication No. 2012/0036034, the disclosure of which is incorporated herein by reference in its entirety.

Cell Allocation

The system 100 can provide online features to register for the system's services as well as features that permit content providers to add, manage, and remove their content campaigns. The system 100 may also provide features that allow a content provider to purchase or place bids for content placements in particular cells or for a particular area selected by the content provider. Cells can be allocated to content providers according to various priority and selectivity schemes including those based on bid amounts, fee, cell location, time/date slots, and target categories (e.g., applications in selected areas of interest). Alternatively or in addition to bidding, content providers can purchase content placement in any suitable manner including, for example, a fixed price, cost per millennium (CPM), cost per click (CPC), cost per acquisition (CPA), cost per interaction, flat rate, cost per action, cost per engagement or any other suitable structure.

In a typical configuration of a cell-allocation system, a program running on a computer creates a virtual grid overlaying an area such as the world or a country or region such as the United States of America, North America, Asia, South America, or Europe. Content placement in one or more cells within the virtual grid is offered to content providers. Upon acceptance of an offer, the cell allocation system permits the cell or cells to be used by the selected content provider to transmit content to information playback devices within the cell or cells, e.g., in a location- and/or application-specific manner.

As an example, one or more (e.g., 1, 2, 3, 4, 5, 10, 100, 1000 or more) content providers can place at least one bid for content placement rights within a bid area. The bid area can include one or more cells of the plurality of cells (e.g., a set of cells determined by a radius from a fixed position such as all cells within 10 km of location X). A winning bid (e.g., a highest bid placed by a content provider) can be selected from among the bids submitted by the different content providers. The content of the content provider submitting the winning bid can then be deployed within the bid area. A non-revenue generating developer application advertisement can be transmitted to those cells lacking a paying advertiser. Deployment of content using this method may be accomplished via a software application installed on the wireless device.

Various aspects of the cell allocation system, including bidding and associated user interfaces, are described in U.S. Patent Application Publication No. 2012/0036034, which is incorporated herein by reference in its entirety.

Content Provider Portal

The system 100 can include a content provider portal system that provides a user-friendly interface that can facilitate targeted or geographically relevant content delivery. The term "portal" is defined as any combination of components or systems that permit a user or another system or component to input, output, manage, generate, process or manipulate data or to control another component or system and can include hardware, software or any suitable combination of hardware and software. An "interface" is defined as a component, system or arrangement or groups thereof that enable information/data to be entered into a machine. The interface can facilitate content providers in the identification of suitable virtual cells 114 for delivery of targeted content based on information associated with the individual cells 114 of the grid 116. The interfaces can include one or more user interface elements, which can include one or more graphical user interface elements. A "user interface element" is defined as a component or a group of components that enables a user to interact with a machine. The term "graphical user interface element" is defined as an image or a portion of an image that presents information to a user or allows the user to interact with a device through a display. Depending upon the implementation, access to content provider portal may be via an Internet-based customer portal accessible to any browser-enabled system or device.

According to embodiments herein, the system 100 can combine large amounts of data from numerous data sources. The data can be assigned to one or more of the virtual cells 114 within the grid 116 based on the relevancy of the data to that cell. Such data can be associated with one or more aspects of the area within the boundaries of the virtual cell. The data can be any suitable type of data. For instance, the data can include contextual, behavioral, predictive, trending, geo-consumer patterns, just to name a few possibilities. The collection and assignment of data to one or more virtual cells within the grid can facilitate advertisement, information and/or content targeting. When an individual virtual cell or group of cells is examined, any data associated therewith can be presented to a user in any suitable manner. The data can be updated and/or optimized on a continuous or other basis.

The data associated with one or more virtual cells 114 within the grid 116 can be obtained from any suitable source. For instance, the data may be obtained from usage of the system 100 itself. Further, the data can include real time, weather, social media, social networks, news, content, location features, POI, tagging, pictures, blogs, QR codes, hardware, NFC, AI, virtual reality, cameras, augmented reality, census, government records, open source, public records, etc. The data may be publicly available information. In one embodiment, the data can be obtained from social media websites such as Facebook, Foursquare, Twitter, LinkedIn, etc. Alternatively, the data may be purchased from a third party source. With data associated with the virtual cells within the grid, trends, interest, patterns and opportunities can be identified to facilitate informed geo-targeting decisions and consumer understandings for business of all sizes and sectors in order to deliver more relevant content.

A user of the system can access a portal for carrying out the features described herein. Such access may be by way of any suitable computing device equipped with an appropriate software application. The portal can present a user interface to allow users to specify a logic to identify one or more cells in the grid to facilitate targeting and delivering content to users of information playback devices.

Figure 2:
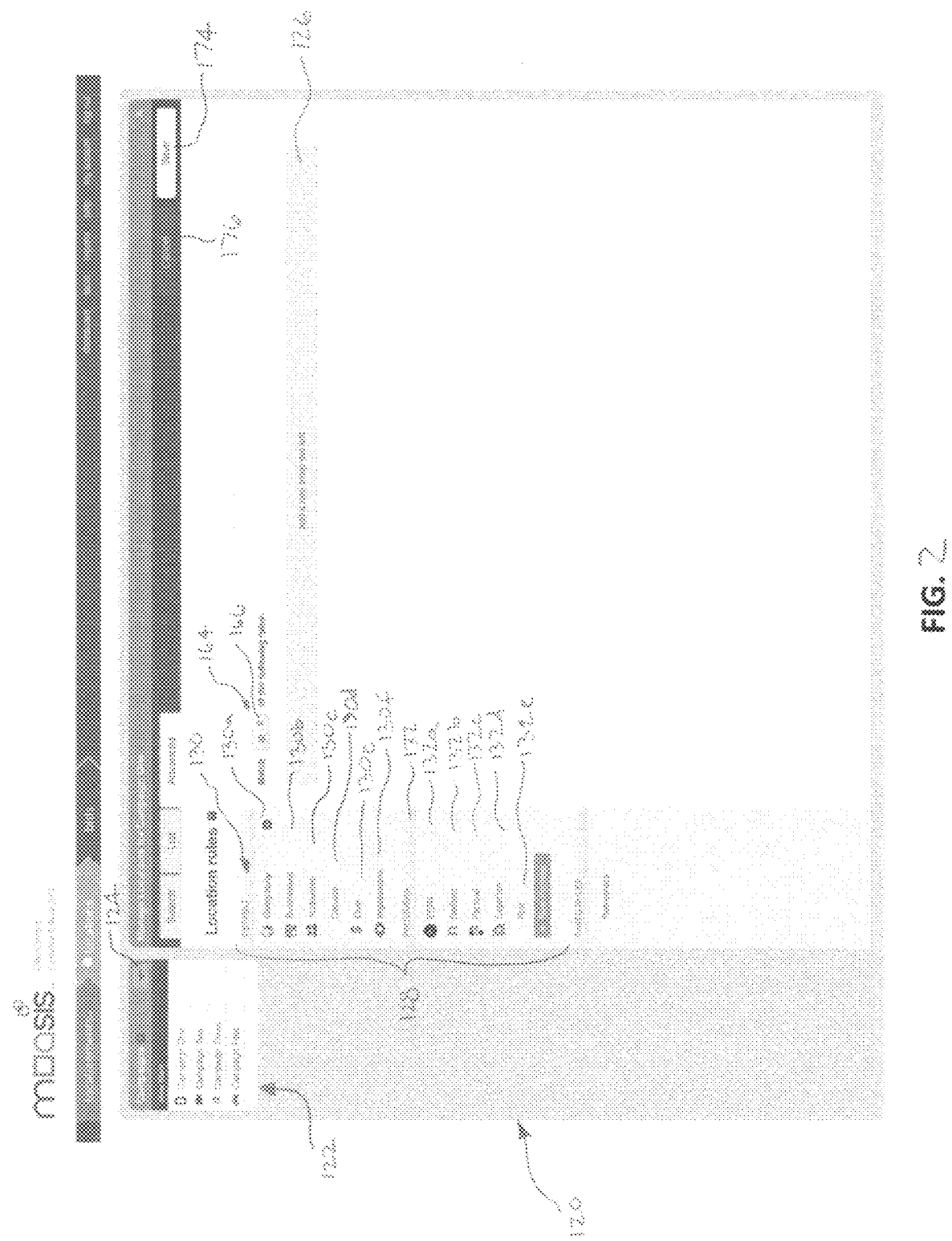
FIG. 2 illustrates an example of a locations page of a content provider portal system.

Referring to FIG. 2, the portal can include a locations page 120 that can be presented to a user. The locations page 120 may also present one or more features to enable a user can build campaigns to conduct searches of the grid for virtual cells of interest therein. A campaign can facilitate the identification and/or selection of virtual cells within the grid for targeting and delivering content to one or more playback devices 102 within the selected virtual cells. The locations page 120 can present a list of campaigns 122 that the user has built. The user can select one or more campaigns from the list 122 to review and/or modify. Further, the user can select the "+" button 130*a* to create a new campaign.

Each campaign can have one or more location rules associated with it. These location rules can be based on the information (e.g., types of audiences, businesses, demographics, geography, etc.) associated with the grid. A selected location rules field 126 can be provided for each campaign. When a new campaign is started, the location rules field 126 can be empty or indicate that a rule can be added from a set of location rules 128, as is shown in FIG. 2.

The selected location rules field 126 can be populated with one or more location rules. The location rules can be selected from the set of location rules 128 provided by the system. The term "set" is defined as a collection of one or more. In some instances, there can be different types of locations rules. For instance, at least some of the location rules can be standard or default rules 130. Default location rules 130 are the location rules that are available to all users of the targeted output portal system. There can also be premium location rules 122, which associate data from third party providers with the grid. Each premium location rule 122 can provide access to the types of data the third party vendor provides and/or a choice between different products within that vendor if multiple data products are offered. In at least some instances, the premium location rules 122 may only be made available to users who have purchased or have otherwise been granted access to those rules. Thus, a user can selectively choose which, if any, premium locations rules 122 it wishes to access. In one embodiment, a user can add premium location rules 122 to their account at a monthly fee based on various factors. It will be appreciated that the premium location rules 122 can allow a user to conduct a more targeted search.

Some possible examples of location rules are shown in the set of location rules 128 on the locations page 120, as shown in FIG. 2. Various examples of location rules will be presented below. It will be understood that the described location rules are merely examples are not intended to represent an exhaustive list. Indeed, additional location rules may be available beyond those described, or there may be fewer location rules available than those described.

A geography rule 130a can be provided among the set of location rules 128. The geography rule 130a can allow a user to search for virtual cells in the grid based one or more geographic parameters. For instance, the geography rule 130a can allow for cell identification and/or selection based on country, state, city, town, zip code, neighborhoods, streets, geographic coordinates, boundaries, landmarks or other suitable geographic parameter. The search can be built to search within or without a specified geographic parameter.

The set of location rules 128 can include a businesses rule 130b. The businesses rule 130b can allow the user to search for virtual cells within the grid based on or containing a specific business (e.g., Starbucks) and/or a type or category of business (e.g., bars and taverns). As an alternative, the user could conduct a negative search for all virtual cells within the grid that do not have a specific business and/or a type or category of business.

An audiences rule 130c can be included in the set of location rules 130c. The audiences rule 130c can allow a user to search for virtual cells within the grid based on the audience or demographic associated with each cell. The "audience" can be defined in any suitable manner by the types of advertisements or content that users in a particular cell respond to or engage in. The audience can be defined by any suitable labels, including, for example, soccer moms, NASCAR dads, etc. The system can aggregate audience information for each cell based on its own data and/or from other data sources.

A census rule 130d can be provided. The census rule 130d can allow a user to search for cells within the grid based on any data available from the U.S. Census Bureau or other census data sources for that cell. Such data can include age, sex, ancestry, births, children, commuting to work time, computer and internet usage, deaths, disability, educational attainment, families and living arrangements, fertility, foreign-born, genealogy, geographical mobility/migration, health insurance, housing, immigration, income, industry and occupation, marriage and divorce, labor force statistics, language use, migration, population estimates, population projections, poverty, race, same sex couples, school districts, school enrollment, religion, veterans, voting and registration, wealth and asset ownership and well-being. As an example, a user could search for cells that have a household income of $100,000 or more.

The set of location rules 128 can include a cost rule 130e. As noted in U.S. Patent Application Publication No. 2012/0036034, the disclosure of which is incorporated herein by reference in its entirety, users of the system can place bids to place advertisements, content, etc. on playback devices in a cell. The cost rule 130e can allow a user to search for cells within the grid based on the average bid price for that cell. For example, a user could search for cells that have an average bid of $0.06 or less.

An impressions rule 130f can be provided among the set of location rules 128. An "impression" is the pushing of an advertisement or content to playback devices in a cell. The impressions rule 130f can allow a user to search for cells within the grid based on the average or actual number of impressions in a cell within a period of time (e.g., yearly, semi-annually, quarterly, monthly, weekly, daily, hourly, etc.). For example, a user can search for cells that have 100,000 or more impressions daily.

An example of a premium location rule is an ESRI rule 132a. The ERSI rule 132a can allow a user to search for virtual cells within the grid based on data offered by Esri, Redlands, Calif. Such data can include demographic, lifestyle segmentation, consumer spending, and business data. The ESRI data can be associated with the grid. As an example, the user can use the ESRI rule to search for cells that are associated with an urban chic lifestyle.

Another example of a possible premium location rule that can be offered is a Nielsen rule 132b. The Nielsen rule 132b can allow a user to search for cells within the grid based on data offered by Nielsen Holdings N.V., New York, N.Y. or any of its subsidiaries or related companies. For instance, market segmentation and other data from Nielsen's PRIZM, P$YCLE, and/or ConneXions systems can be assigned to the grid. In one embodiment, the user could select the Nielsen rule and, more particularly, PRIZM to search the grid for cells that are associated with any market segment or other label associated with PRIZM, such as "Big fish, Small pond."

A Factual rule 132c can be provided among the set of location rules 128. The Factual rule 132c can allow a user to search for virtual cells within the grid based on any and all data offered by Factual Inc., Los Angeles, Calif. Examples of such data include global places data (e.g., local businesses and points of interest), restaurants data, hotels data, healthcare provider data, etc. As an example, a user can employ the Factual rule 132c to search for cells that have people with an age above 30.

An Experian rule 132d can be provided. The Experian rule 132d can allow a user to search for virtual cells within the grid based on any and all data offered by Experian plc, Dublin, Ireland, including related entities such as Experian Simmons. Examples of such data include behavioral and attitudinal research with information on people's demographics, lifestyles, media habits and shopping habits. As an example, a user can include an Experian rule 132d in a campaign to search for cells in which "golf" is included in the lifestyle. It will be appreciated that, alternatively or in addition, location rules with data from other consumer database companies (e.g. Equifax, Acxiom, etc.) can be provided.

Still another rule that can be provided is a Polk rule 132e. The Polk rule 132e can allow a user to search for virtual cells within the grid based on any and all data offered by R. L. Polk & Co., Southfield, Mich. Examples of such data include any and all information regarding consumer and industry automotive information. A Polk rule can 132e allow a user to search for cells within the grid by "Brand Affinity." For instance, a user can search for brand affinity by make and/or model of an automobile.

Again, the above premium location rules 132 are merely provided as examples. Indeed, there are numerous companies and products that offer consumer segmentation and/or other data that can allow a user to filter the grid to ascertain a particular audience. Further examples include: Cluster Plus, Psyte, PersonicX Geo, Tapestry MOSAIC, QAS, or Delineate.

Figure 3:
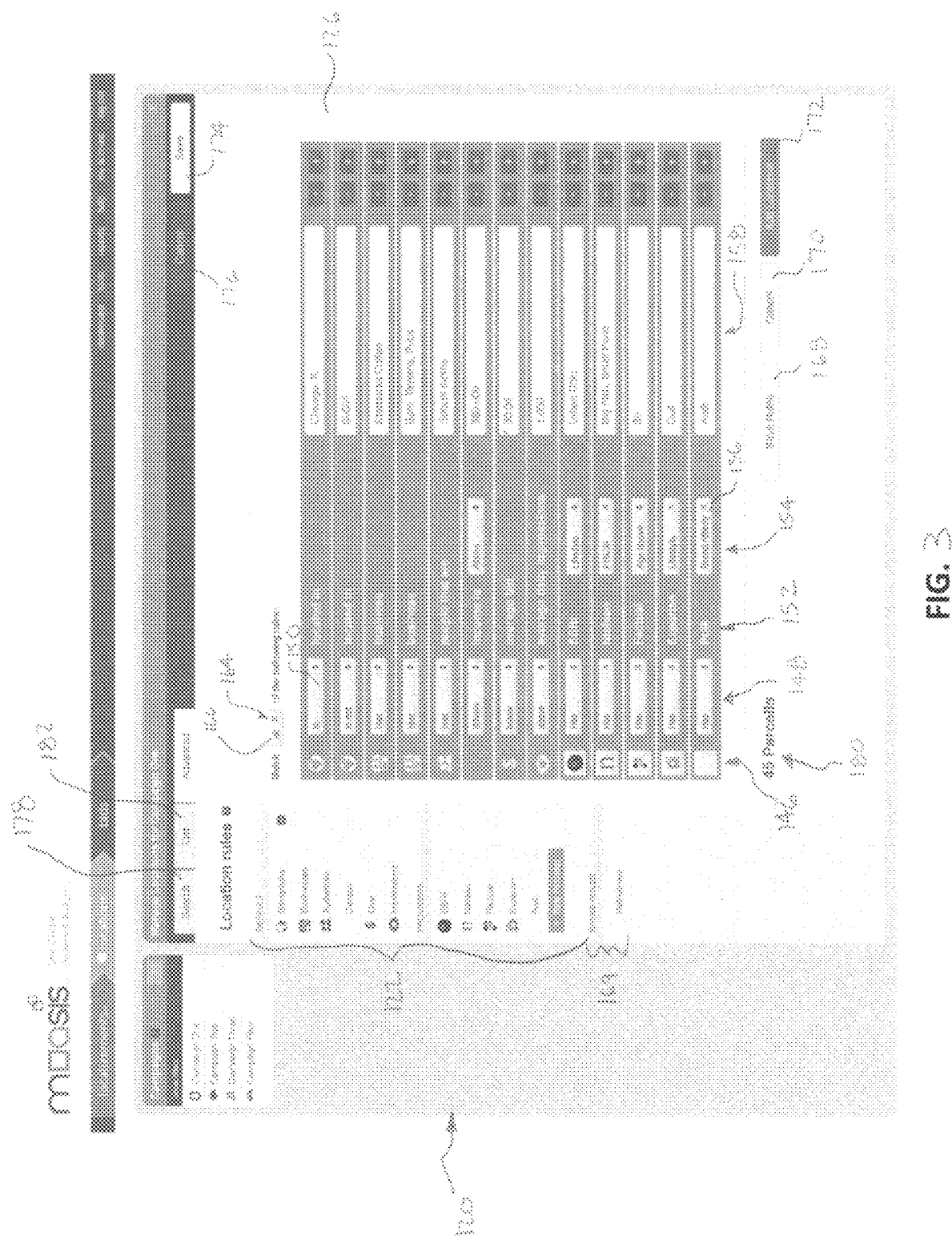
FIG. 3 illustrates an example of a locations page of a content provider portal system, showing a location rules field populated by a set of location rules.

As the user selects one or more location rules for its campaign, the selected location rules can populate the location rules field 126 on the locations page 120, as is shown in FIG. 3. The field 126 can be organized and/or arranged in any suitable manner. In one embodiment, the field 126 can be presented in a predetermined manner. For instance, the individually selected location rules can be provided in rows. Various fields can be presented in the rows. Such fields can be generally arranged in columns. An example of such an arrangement is shown in FIG. 3. However, it will be understood that the field can be arranged differently and may include additional or fewer columns. In some instances, the organization and/or arrangement of the selected location rules field 126 can be customized by the user.

Various possible fields for each selected location rule will now be described. Each location rule can include a graphical indicator 146 of the rule. These graphical indicators 146 can be the same as the graphical indicators that appear next to each rule in the set of location rules 128.

Next, the location rule can include a first location definition field 148 that allows a user to input at least a portion of the definition of the rule. In some instances, the user may have to input data into the field manually. In other instances, a graphical user interface element, such as a button 150, can be provided to facilitate the user's input. In such case, when the button 150 is selected, the user may be presented with one or more predetermined choices for the field.

FIG. 3 shows various inputs for the first location definition field 148. Under the geography rules, a user may be able to input "is" or "is not" in any suitable manner, such as by selecting the button 150. With respect to the businesses rule and/or the audiences rule, the user may be able to input "has" or "does not have." Additional non-limiting examples are shown in FIG. 3.

Further, the location rule can present a data descriptor field 152. The data descriptor field 152 can provide a description of the data that is being search. The data descriptor field may be 152 predetermined for each rule type, as is shown in FIG. 3. However, in some instances, the data descriptor field 152 can be manually input by the user.

The location rule may provide a second definition field 154 that allows a user to input at least a portion of the definition of the rule. In some instances, the user may have to input data into the field 154 manually. In other instances, a graphical user interface element, such as a button 156, can be provided to facilitate the user's input. In such case, the button 156 may provide the user with one or more predetermined choices for the field 154. Various inputs for the second definition field 154 are shown in FIG. 3. For instance, under the Nielsen rules, a user may be able to select which Nielsen product—here "PRIZM"—to use. Some rules may not have an associated second definition field, as is shown in the geography, businesses, audiences and census rules in FIG. 3.

A third definition field 158 can be provided to allow a user to input at least a portion of the definition of the rule. As shown in FIG. 3, the user may have to manually input the desired data in the field 158. For instance, a user can input a specific city, state and/or zip code in the third definition field for the geography rule.

The locations page 120 can be configured to allow a user to selectively expand or contract the location rules. To that end, one or more user interface elements, such as graphical user interface elements (e.g. buttons) can be presented to the user. For instance, a user may wish to include more than one geography rule. In such case, a user may activate select the "+" or add button 160 to add another geography rule to the campaign. Alternatively, the user may wish to delete one or more of the geography rules. In such case, the user can select the "−" or remove button 162 to delete the particular geography rule to the campaign.

A match field 164 can be provided to allow the user to indicate whether a search under the campaign must match all of the rules or some subset thereof (e.g., any, 50% or more match, 60% or more match, 70% or more match, 80% or more match, 90% or more match, 95% or more match, etc.). In some instances, the user may have to input data into the field 164 manually. In other instances, a graphical user interface element, such as a button 166, can be provided to facilitate the user's input. In such case, the button 166 may provide the user with one or more predetermined choices for the field 166.

After all the rules are configured and the campaign is built, a user can select the "Save Rules" button 168 to save the set of location rules for quick access in the future, possibly in connection with a different campaign. Any saved rules can appears in a saved rules field 169 on the locations page 120. If the user wishes to discard all of the location rules assigned to the campaign, the user can select the "Cancel" button 170. The user can select the "Add Locations" button 172 if additional location rules are to be included in the campaign. The user can save a campaign by selecting the "Save" button 174, or the user can delete a campaign by selecting a "Cancel" button 176 provided on the locations page 120.

Additional potential aspects of the locations page are described in U.S. Patent Application Publication No. 2012/0036034, the disclosure of which is incorporated herein by reference in its entirety.

Once the campaign is built, a search of the grid can be performed according to the location rules associated with the campaign. The system will aggregate the selected providers of data to the grid. The system can search the grid to determine which virtual cells within the grid match the rules of the campaign. The user can initiate the search in any suitable manner, such as by using the "SEARCH" tab 178 or other provided user interface element.

The system will output all matching cells. The matching cells can be output in any suitable manner. For instance, a search results indicator 180 can be provided on the locations page 120. The search results indicator 180 can display the quantity of matching cells of the grid. The search results indicator 180 can be automatically updated as the selected rule field 116 is populated. Alternatively or in addition, a list of cells with cell identifying information can be provided under the "List" tab 182.

Figure 4:
FIG. 4 illustrates an example of a search output page of a content provider portal system, showing cells that match the locations rules of the search.

Alternatively or in addition, the results can be displayed on a localized map 184, as is shown in FIG. 4. The map 184 can be generated using any suitable mapping program. FIG. 4 shows an example of a map-based search results. The grid can overlay the map. The cells that match the campaign rules can be offset, such as in a different color, to indicate a match. Alternatively or in addition, the cells can be color coded to show the degree to which that cell matches. For instance, a red colored cell 186R could indicate a 100% match, an orange cell 186O could indicate a high match (e.g. about 90 to about 99 percent), etc. A cell that is not colored 186NC can indicate that the cell does not match any of the campaign rules. The map 184 can include a zoom bar 188 to allow the user to selectively zoom in and out of the map.

The system can be configured to allow a user to view the map 184 under different settings. To that end, a settings bar 190 can be provided. One example of a setting that a user can manipulate is the time such that the user can view the map 184 at different times. As an example, the use can view the map 184 for different days and/or different times of the day. The system may be configured to allow a user to watch an animation of how the results of the campaign may vary throughout a day, week, month or other time period. In this way, the user may be able to discern optimal times and/or patterns throughout a period of time such that the user can selectively target the intended audience.

However, in addition to temporal changes, the settings bar 190 can allow a user to manipulate other settings, including, for example, campaigns, localizements, users, networks, environment, data, behaviors, and/or bidding.

Figure 5:
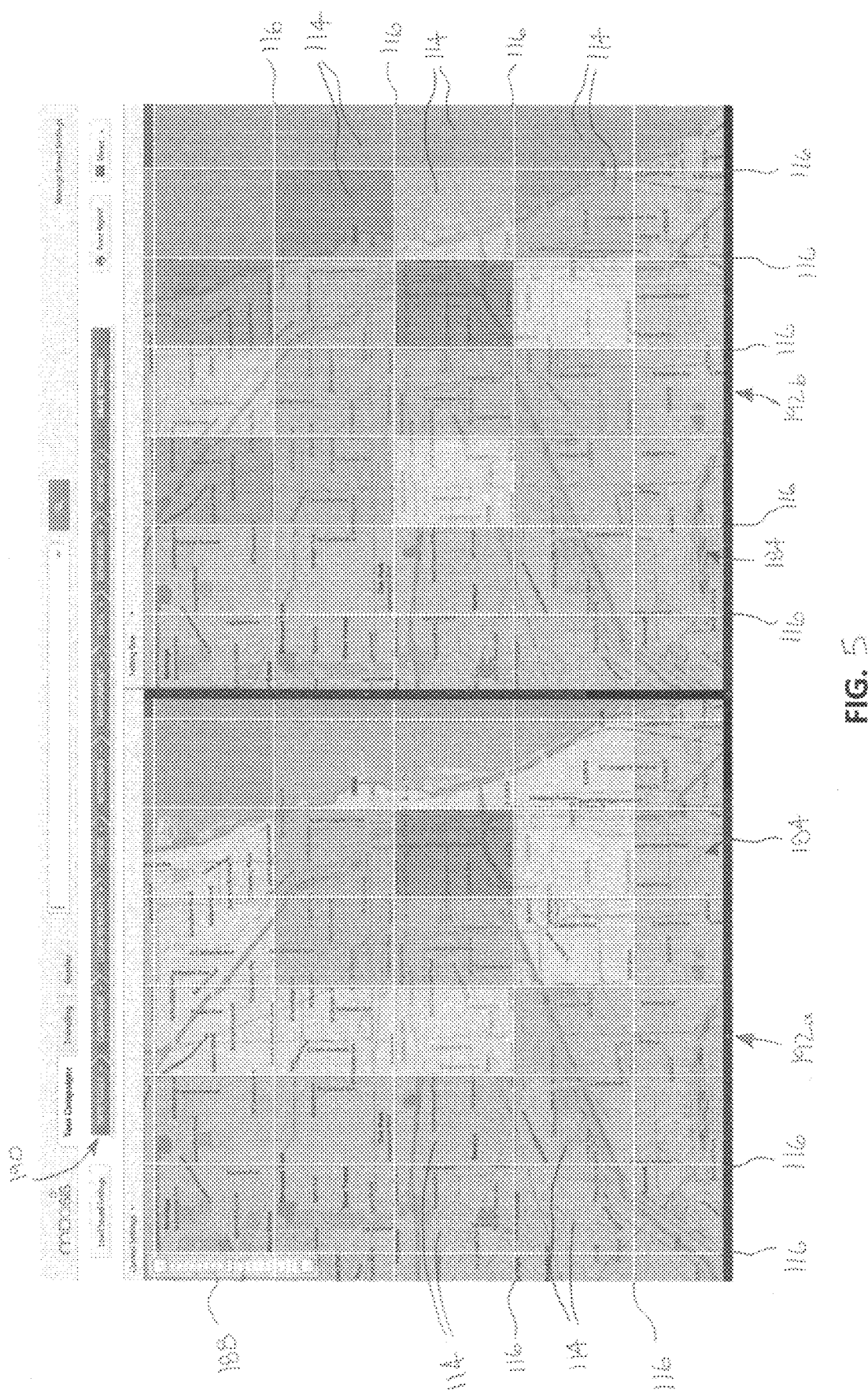
FIG. 5 illustrates an example of a search output page of a content provider portal system, showing a plurality of screens showing the same cells under different conditions.

FIG. 5 shows an example in which a plurality of screens 192a, 192b is presented to the user. Each screen 192a, 192b can include the same map 184, but each screen can show the map under one or more altered conditions. For instance, one map can show the matching cells at a first time of the day, and the other map can show the matching cells at a second time of the day. Such a side by side comparison can provide a user with an organized and informed approach in targeting and delivering advertisements or contents to playback device users in a cell.

Figure 6:
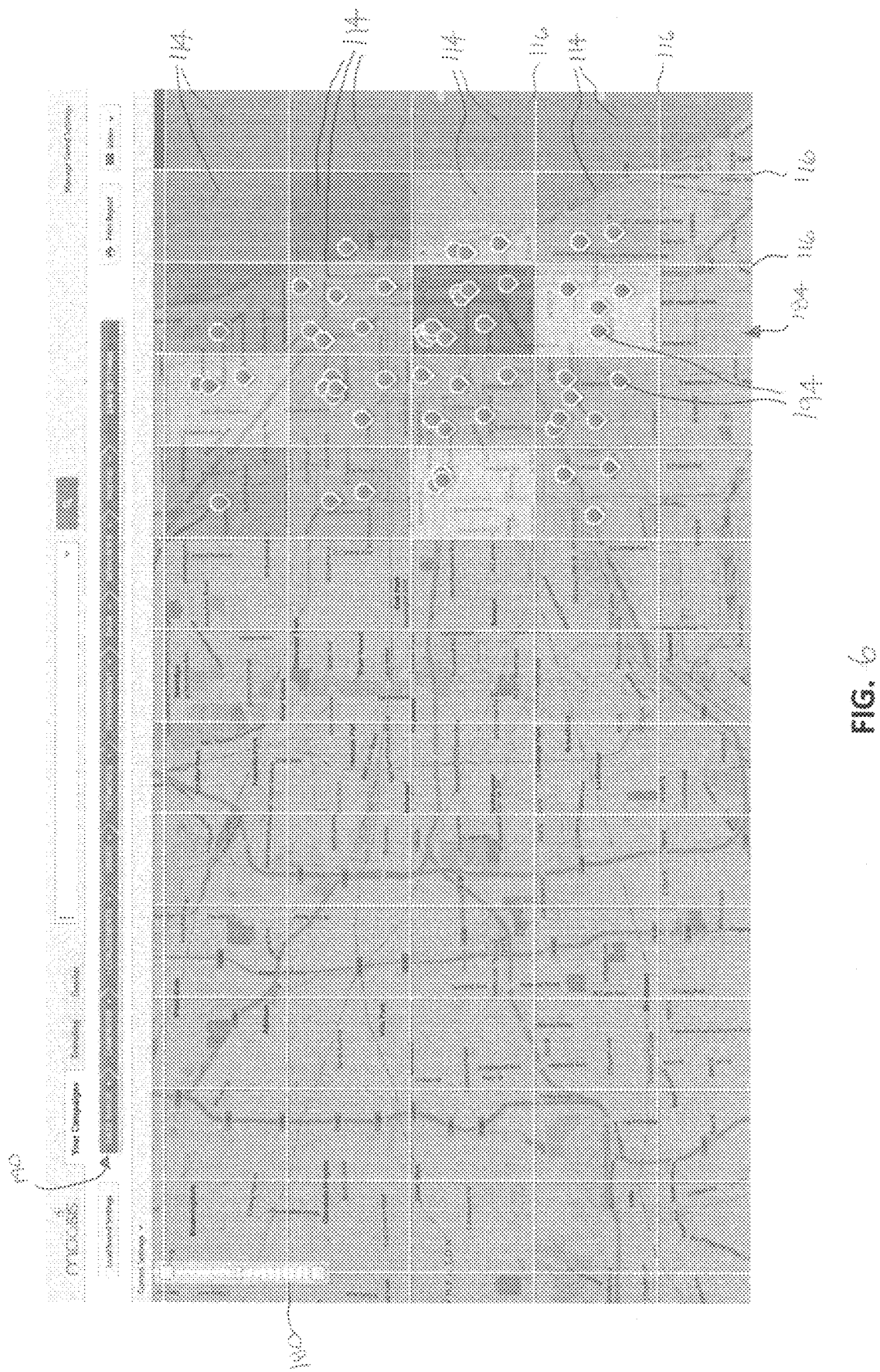
FIG. 6 illustrates an example of a search output page of a content provider portal system, showing impressions within cells that match the locations rules of the search.

FIG. 6 shows a map 184 of matching cells 114 of the grid 116 and further includes graphical representations of impressions 194, that is, when advertisement and/or content is pushed to information playback devices in the cell 114.

Once the matching cells are identified, the user can consider the matching cells and decide whether to place a bid in one or more of the matching cells. Thus, it will be appreciated that the system can facilitate the identification of suitable cells based on the user's custom parameters. If the user wishes to place a bid for the cell, the user can access a bid page to submit the desired bid. Any suitable bid screen and type of bidding system can be implemented. Various examples of bids are presented in U.S. Patent Application Publication No. 2012/0036034, the disclosure of which is incorporated herein by reference in its entirety.

Figure 7:
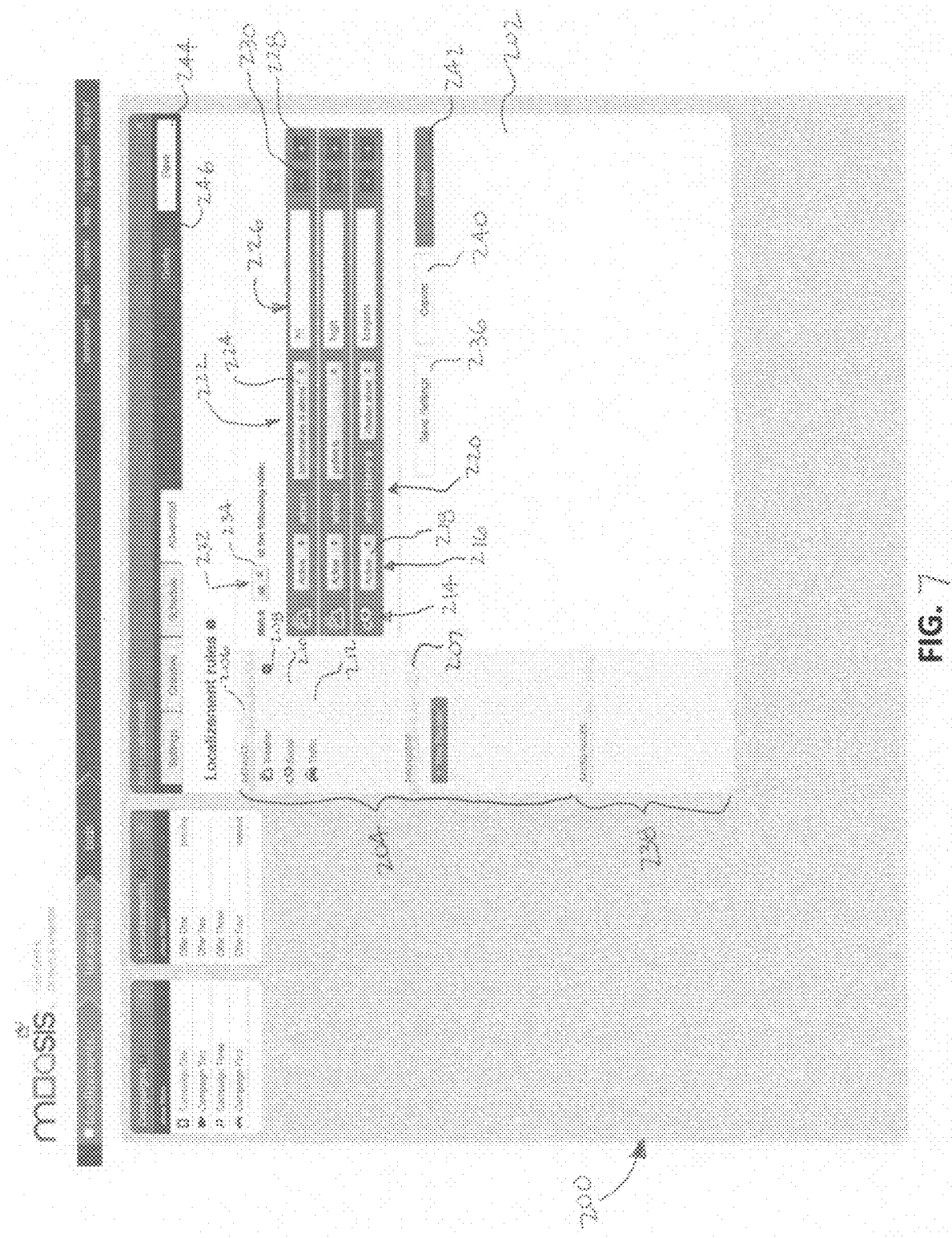
FIG. 7 illustrates an example of a localizements page of a content provider portal system.

The system can also be configured to allow the user to set rules for when its content (advertisement, content, information, etc.) should be active based on one or more conditions or variables within one or more virtual cells. To that end, the portal system can present a localizements page. An example of a localizements page 200 is shown in FIG. 7. The localizements page 200 provides a user interface for the user to set rules for when its content should be active and/or inactive.

Each of the user's bids and/or campaigns can have one or more localizement rules associated with it. These localizement rules can be based on any suitable variable that can occur while the user's content is active. The localizement page can include a selected localizement rules field 202. Initially, the field 202 can be empty, awaiting localizement rule selection and data input from a user.

The localizement rules field 202 can be populated with one or more localizement rules. The localizement rules can be selected from a set of localizement rules 204 provided by the system. In some instances, there can be different types of localizement rules. For instance, at least some of the localizement rules can be standard or default rules 206. Default localizement rules 206 are the localizement rules that are available to all users of the system. In some instances, there can also be premium localizement rules 207, which can include data from third party providers.

Some possible examples of localizement rules are shown in the set of localizement rules 204, as shown in FIG. 7. Various examples of localizement rules will be presented below. It will be understood that the described location rules are merely examples are not intended to represent an exhaustive list. Indeed, additional localizement rules may be available beyond those described, or there may be fewer localizement rules available than those described.

One possible localizement rule is a weather rule 208. The weather rule 208 can allow a user to indicate that the content is to be active or inactive when a specified weather condition is present or not present. For instance, the weather rule 208 can be configured so that the content can be active or inactive when the temperature is above or below a specified temperature within a specific cell or at a specific location. Alternatively or in addition, the weather rule 208 can be configured so that the content can be active or inactive when certain lifestyle weather conditions are or are not present, such as pollen levels, UV levels, humidity, precipitation, etc. As an example, the content can be active or inactive when the pollen is high.

Another possible localizement rule is a social rule 210. The social rule can allow a user to indicate that the content is to be active or inactive when certain keywords or conditions appear or do not appear in social chatter on one or more social media websites (e.g., Twitter, Facebook, Instagram, etc.) relating to an aspect of a specific cell or other area. For example, if location aware "tweets" mention burgers, then the system can monitor that keyword in a specific area and activate or deactivate the content, as specified by the localizement rule.

Still another possible localizement rule is a traffic rule 212. The traffic rule can allow a user to indicate that the content is to be active or inactive when based on one or more traffic conditions in a specific area, which can be within or without a selected cell. In one embodiment, the traffic rule 212 can be configured so that the content can be active or inactive if the traffic is heavy on a specific highway.

Again, the above localizement rules are merely provided as examples. As the user selects one or more localizement rules, the selected localizement rules can populate the localizement rules field 202 on the localizement page 200, as is shown in FIG. 7. The field 202 can be organized and/or arranged in any suitable manner. In one embodiment, the field 202 can be presented in a predetermined manner. For instance, the individually selected localizement rules can be provided in rows, and the various fields presented in the rows can be generally arranged in columns. An example of such an arrangement is shown in FIG. 7. However, it will be understood that the field can be arranged differently and may include additional or fewer columns. In some instances, the organization and/or arrangement of the localizement rules field can be customized by the user.

Each localizment rule can include one or more fields that allow a user to design the rule. Various possible will now be described. Each localizement rule can include a field 214 presenting graphical indicator of the rule. These graphical indicators can be the same as the graphical indicators that appear next to each rule in the localizement rules menu.

Next, the localizement rule can include an output status field 216 that allows a user to indicate whether the output is to be active or inactive. In one embodiment, a graphical user interface element, such as a button 218, can be provided to facilitate the user's input. In such case, the button 218 may provide the user with one or more predetermined choices for the field 216, which can be accessed by selecting the button 218.

Further, the localizement rule can present a qualifier field 220. The qualifier field 220 can be a predetermined, automatically populated field for each localizement rule type, as is shown in FIG. 7. As an example, for a weather rule 208, the field 220 can include the word "when." For a social rule 210, the field 220 can include the word "when there's." For a traffic rule 212, the field 220 can include the word "when." In some instances, the qualifier field 220 can be customized by the user's input.

The localizement rule can provide a first definition field 222 that allows a user to input at least a portion of the definition of the localizement rule. In some instances, the user may have to input data into the field manually. In other instances, a graphical user interface element, such as a button 224, can be provided to facilitate the user's input. In such case, the button 224 may provide the user with one or more predetermined choices for the field 222, which can be presented upon selecting the field. Various inputs for the second definition field 222 are shown in FIG. 7. For instance, under the weather rule 208, a user can input "temperature is above" or "pollen is," just to name a few possibilities. For the social rule 210, an example of a user input is "chatter about."

A second definition field 226 can be provided to allow a user to input at least a portion of the definition of the localizement rule. As shown in FIG. 7, the user may manually input the desired data in the field 226. For instance, a user can input a specific temperature or pollen condition in the second definition field for the weather rule.

The localizement page 200 can be configured to allow a user to selectively expand or contract the localizement rules. To that end, one or more user interface elements, such as graphical user interface elements (e.g. buttons) can be presented to the user. For instance, a user may wish to include more than one weather rule 208. In such case, a user may activate select the "+" or add button 228 to add another weather rule 208 to the localizement. Alternatively, the user may wish to delete one or more of the weather rules 208. In such case, the user can select the "−" or remove button to 230 delete the particular localizement rule.

A match field 232 can be provided to allow the user to indicate whether a bid or campaign having the associated localization rules must match all of the localization rules or some subset thereof (e.g., 50% or more match, 60% or more match, 70% or more match, 80% or more match, 90% or more match, 95% or more match, etc.). In some instances, the user may have to input data into the field 232 manually. In other instances, a graphical user interface element, such as a button 234, can be provided to facilitate the user's input. In such case, the button 234 may provide the user with one or more predetermined choices for the match field 232.

After all the rules are configured and the localizement is built, a user can select a graphical user interface element, such as the "Save Settings" button 236, to save the set of localizement rules for quick access in the future (e.g., in connection with a different campaign and/or bid). Any saved rules can appears in a saved rules field 238 on the localizement page 200. If the user wishes to discard all of the localizement rules assigned to the campaign or bids, the user can select the "Cancel" button 240. The user can save a localizement by selecting the "Save" button 242. A campaign or bid having an associated localizement can be saved by selecting a graphical user interface element, such as the "Save" button 244. Likewise, if a user wishes to delete a localizement from a campaign or bid, then the use can select an appropriate graphical user interface element, such as the "Delete" button 246.

Once the localizement is built, the localizement can be applied to any successful bids for content by the user. Thus, when the conditions indicated in the localizement rules arises, then the indicated action with respect to the content (e.g., active or inactive) can be performed.

Figure 8:
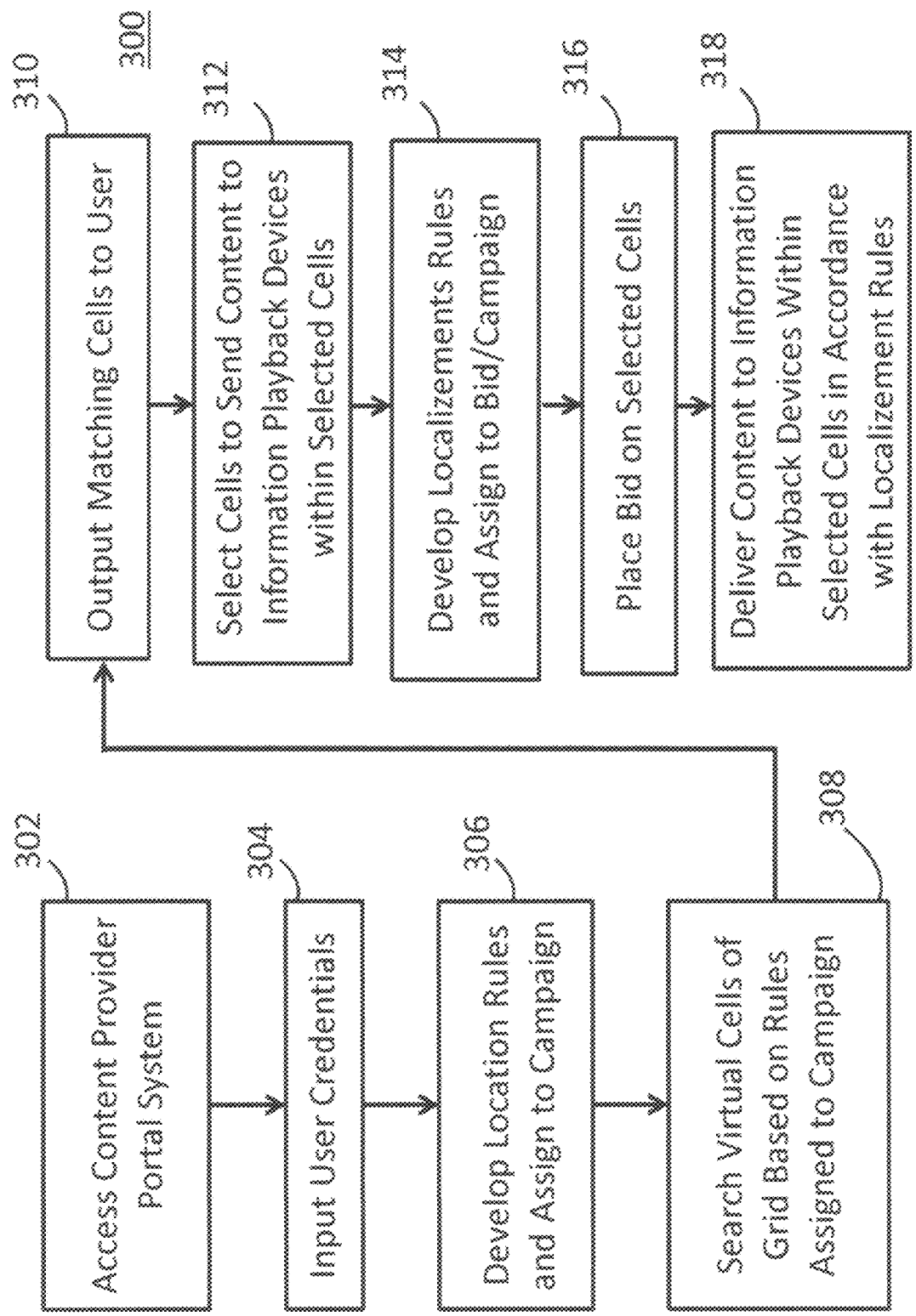
FIG. 8 is an example of a method of delivering targeted or geographically relevant content to information playback devices within one or more virtual cells of a virtual grid.

Now that various aspects of the content provider output portal system have been presented, one manner of operating the system will now be described. Referring to FIG. 8, an example of a method 300 of delivering targeted content or geo-specific output to information playback devices within one or more virtual cells of a grid is shown. Various possible steps of method 300 will now be described. The method 300 illustrated in FIG. 8 may be applicable to the embodiments described above in relation to FIGS. 1-7, but it is understood that the method 300 can be carried out with other suitable systems and arrangements. Moreover, the method 300 may include other steps that are not shown here, and in fact, the method 300 is not limited to including every step shown in FIG. 8. The steps that are illustrated here as part of the method 300 are not limited to this particular chronological order, either. Indeed, some of the steps may be performed in a different order than what is shown and/or at least some of the steps shown can occur simultaneously.

In block 302, a user can access the targeted/geo-specific output portal system. Access can be made by any suitable communication device. In block 304, a user can be prompted to input user credentials, such as a password, for authentication. If sufficient authentication is provided, then access to the portal system is permitted. At block 306, the administrator can develop one or more location rules for assignment to a campaign. The rules can include the degree to which the user wishes the information associated with the cells to match the location rules.

At block 308, a search of the individual cells of the grid can be performed based on the campaign. That is, potential cells of interest can be determined by comparing the rules of the campaign to information assigned to one or more cells 114 of the grid 116. At block 310, the matching cells 114 can be output to the user, such as by displaying a list of the matching cells 114 or a map showing the matching cells 114, as described earlier. Again, the matching cells 114 can be presented in any suitable form.

At block 312, the user can review the matching cells 114 to determine which, if any, should be selected for sending the content (e.g., advertisements, information content, etc.) to playback devices 102 within the selected cells 114. At block 314, localizements rules can be developed and assigned to a bid and/or a campaign. At block 316, a bid can be placed on the selected cells 114. The bid can be submitted in any suitable form and the bidding process can follow the rules of any bidding process. If the bid is successful, the content can be delivered to playback devices 102 that enter or are located within the selected cells 114 in accordance with any localizement rules established for the bid/campaign at block 318 or any other rules or terms associated with the bid (e.g., a certain time interval specified in the bid). Any suitable bid process and associated user interface can be used. Some examples are described in U.S. Patent Application Publication No. 2012/0036034, which is incorporated herein by reference in its entirety.

It will be appreciated that methods such as the one shown in FIG. 6 and associated system can provide numerous benefits. For instance, the system can allow a content provider to specifically target a desired demographic with high cost efficiency and flexibility. The portal system can facilitate a user's ability to plan and target its content by providing a visual reference tool to filter the audience. Further, the system provides the user with the flexibility to selectively aggregate and disaggregate consumer/market data associated with each virtual cell. Thus, the user can attain a desired level of granularity so that the user can re-aggregate the data to target the content to any scale the user chooses. For instance, a user may wish to purchase output time in two markets and have the option of making additional selections in each market. Additionally, the system provides a user with the ability to "gerrymander" arrange for certain geo-targeting outcomes to deliver the content.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The corresponding structures, materials, acts, and equivalents of all means or step plus function elements in the claims below are intended to include any structure, material, or act for performing the function in combination with other claimed elements as specifically claimed. The description of the embodiments disclosed within this specification are presented for purposes of illustration and description, but are not intended to be exhaustive or limited to the form disclosed. Modifications and variations will be apparent to those of ordinary skill in the art without departing from the scope and spirit of the embodiments herein.

What is claimed is:

1. A method of delivering targeted or geographically relevant content comprising:
    dividing, by a computing device, a geographical area into a virtual grid comprising a plurality of cells, individual cells of the plurality of cells adjustable in size;
    assigning, by the computing device, geographically relevant information to the plurality of cells based at least in part on a geographical relevancy of the geographically relevant information to individual ones of the plurality of cells;
    receiving, at the computing device and via a transceiver, a set of location rules from a content provider, the set of location rules including:
        geography rule that enables searching the virtual grid for cells based on one or more geographic parameters,
        businesses rule that enables searching the virtual grid for cells based on one or more business names and/or one or more business types,
        audiences rule that enables searching the virtual grid for cells based on an excluded audience or demographic parameters,
        census rule that enables searching the virtual grid for cells based on data available from a provider of census data, and
        impressions rule that enables searching the virtual grid for cells based on the average or actual number of impressions in a cell within a period of time;
    responsive to receiving the set of location rules, comparing, by the computing device, the set of location rules to the geographically relevant information assigned to the individual ones of the plurality of cells;
    outputting, by the computing device, a set of cells that matches one or more of the set of location rules, wherein outputting the set of cells includes presenting on a display the set of cells as an overlay to a map associated with the geographically relevant information, the overlay including different colors to indicate a degree to which different cells of the set of cells match the one or more of the set of location rules;
    receiving, by the computing device and from the content provider, a bid of the content provider for content placement in the set of cells, the bid including a selection of at least one cell of the set of cells;
    accepting, by the computing device, the bid for the content placement in the at least one cell of the set of cells;
    receiving, by the computing device and from the content provider, content for placement in the at least one cell of the set of cells;
    continuously tracking and receiving, by the computing device and via the transceiver and a cellular tower, position data associated with an information playback device;
    determining, based at least in part on the position data, that the information playback device is within the at least one cell of the set of cells; and
    responsive to accepting the bid and determining the information playback device is within the at least one cell of the set of cells, transmitting, by the computing device, at least a portion of the content over a network to the information playback device located in the at least one cell of the set of cells.

2. The method of claim 1, further including:
    offering access to geographically relevant information from a third party provider upon satisfying a condition;
    responsive to satisfying the condition, allowing access to the geographically relevant information from the third party provider; and
    assigning the geographically relevant information from the third party provider to respective cells of the virtual grid.

3. The method of claim 2, wherein the condition is payment of a fee.

4. The method of claim 2, further including:
    presenting location rules associated with the geographically relevant information from the third party provider, whereby further customized searching of the virtual grid is enabled.

5. The method of claim 1,
    wherein transmitting at least the portion of the content includes transmitting instructions to cause the at least the portion of the content to be displayed by the information playback device.

6. The method of claim 5, further including:
receiving one or more localizement rules assigned to the winning bid, and wherein the transmitting is performed in accordance with the one or more localizement rules.

7. The method of claim 6, wherein the one or more localizement rules include a weather condition, a social media condition, or a traffic condition relating to the at least one cell of the set of cells.

8. The method of claim 7, wherein a localizement rule of the one or more localizement rules includes a traffic condition and causes content to be active or inactive within the at least one cell based at least in part on amount of traffic on a specific highway.

9. The method of claim 1, wherein outputting the at least one cell that matches one or more of the set of location rules includes outputting a map in which the at least one cell is in a color different than other cells.

10. The method of claim 9, further comprising:
receiving potential content for placement in the at least one cell from the content provider;
generating an animation representative of results of the content being output to a potential playback device located in the at least one cell; and
outputting the animation.

11. The method of claim 10, wherein the animation represents the results over a given time period.

12. The method of claim 1, wherein the set of location rules include a social rule that activates and deactivates content based on appearance of keywords in social feeds within the plurality of cells.

13. The method of claim 1, wherein the set of cells comprises a first set of cells and the method further comprising:
receiving an input representing a time of day;
responsive to the input, comparing the set of location rules to the geographically relevant information assigned to the individual ones of the plurality of cells at the time of day; and
outputting a second set of cells that matches one or more of the set of location rules at the time of day, wherein outputting the second set of cells includes presenting the second set of cells as a second overlay to the map associated with the geographically relevant information, the second overlay including different colors to indicate a degree to which different cells of the second set of cells match the one or more of the set of location rules, at least one cell of the second set of cells having a different color than a corresponding cell of the first set of cells.

14. A system comprising:
a transceiver in communication with a content provider;
a processor;
a memory storing instructions executable by the processor to cause the processor to:
divide a geographical area into a virtual grid comprising a plurality of cells, wherein individual cells of the plurality of cells are adjustable in size;
assign geographically relevant information and current pollen related information to at least a portion of the plurality of cells based at least in part on a geographical relevancy of the geographically relevant information to individual ones of the plurality of cells;
receive a set of location rules from the content provider, the set of location rules including a pollen condition;
responsive to receiving the set of location rules, compare the set of location rules to the geographically relevant information assigned to each of the plurality of cells to identify a set of cells, each cell of the set of cells matching at least a predetermined number of location rules of the set of location rules, the set of cells including at least one cell that matches the pollen condition;
cause the transceiver to output data associated with the set of cells over a network, whereby informed geo-targeting decisions and consumer understandings is facilitated so more relevant content can be selectively delivered to information playback devices within one or more of the cells, wherein outputting the data includes sending the data over the network and presenting the data on a display as an overlay to a map associated with the geographically relevant information, the overlay including different colors to indicate a degree to which different cells of the set of cells match the one or more of the set of location rules;
receiving, via the transceiver and the network, a bid for content placement in the set of cells from the content provider, the bid including a selection of the set of cells;
accepting the bid for the content placement in the at least one cell;
receiving, via the transceiver and the network, content for placement in the set of cells from the content provider;
continuously tracking and receiving, via the transceiver and a cellular tower, position data associated with an information playback device; and
responsive to accepting the bid and determining the information playback device is within the at least one cell of the set of cells, causing the transceiver to transmit at least a portion of the content to the information playback device located in at least one of the set of cells.

15. The system of claim 14, wherein the set of location rules includes at least one of:
a geography rule that enables searching the virtual grid for cells based on one or more geographic parameters;
a businesses rule that enables searching the virtual grid for cells based on one or more business names and/or one or more business types;
an audiences rule that enables searching the virtual grid for cells based on an audience or demographic parameters;
a census rule that enables searching the virtual grid for cells based on data available from the US Census Bureau; and
an impressions rule that enables searching the virtual grid for cells based on the average or actual number of impressions in a cell within a period of time.

16. The system of claim 14, wherein the memory stores additional instructions which when executed by the processor, cause the processor to cause the at least the portion of the content to be displayed on the information playback device.

17. The system of claim 16, wherein the memory stores additional instructions which when executed by the processor, cause the processor to:
receive one or more localizement rules assigned to the winning bid, wherein the transmitting is performed in accordance with the one or more localizement rules.

18. The system of claim 17, wherein the one or more localizement rules include a pollen condition.

19. The system of claim 17, wherein the one or more localizement rules include one of a weather condition, a social media condition or a traffic condition relating to the cell.

20. The system of claim 14, further including:
a location tracking system for determining the geographical location of one or more information playback devices from signals transmitted from the one or more information playback devices.

\* \* \* \* \*